(12) United States Patent
Champagne et al.

(10) Patent No.: US 7,000,024 B1
(45) Date of Patent: Feb. 14, 2006

(54) SYSTEMS AND METHODS FOR PROVIDING TRANSMISSION CONTROL PROTOCOL COMMUNICATIONS

(75) Inventors: Jean-Philippe Champagne, Goleta, CA (US); James A. Aviani, Santa Barbara, CA (US)

(73) Assignee: Cisco Technology, Inc., San Jose, CA (US)

( * ) Notice: Subject to any disclaimer, the term of this patent is extended or adjusted under 35 U.S.C. 154(b) by 767 days.

(21) Appl. No.: 09/901,523

(22) Filed: Jul. 9, 2001

(51) Int. Cl.
*G06F 15/16* (2006.01)
(52) U.S. Cl. .................. 709/232; 709/218; 709/219; 709/248; 370/231
(58) Field of Classification Search ............. 709/203, 709/217–219, 227, 230–233, 229–237, 248
See application file for complete search history.

(56) References Cited

U.S. PATENT DOCUMENTS

| | | | | |
|---|---|---|---|---|
| 5,935,212 | A * | 8/1999 | Kalajan et al. | 709/228 |
| 6,065,117 | A | 5/2000 | White | 713/159 |
| 6,081,807 | A | 7/2000 | Story et al. | 707/101 |
| 6,215,769 | B1 * | 4/2001 | Ghani et al. | 370/230 |
| 6,321,269 | B1 * | 11/2001 | Walker | 709/237 |
| 6,535,482 | B1 | 3/2003 | Hadi Salim et al. | 370/229 |
| 6,560,243 | B1 | 5/2003 | Mogul | 370/468 |
| 6,744,765 | B1 | 6/2004 | Dearth et al. | 370/394 |
| 6,745,361 | B1 | 6/2004 | Gradischnig | 714/749 |
| 6,779,033 | B1 * | 8/2004 | Watson et al. | 709/227 |
| 2001/0043564 | A1 | 11/2001 | Bloch et al. | 370/230 |
| 2002/0007455 | A1 | 1/2002 | Wiederin et al. | 713/162 |
| 2002/0159396 | A1 | 10/2002 | Carlson et al. | 370/252 |
| 2002/0181494 | A1 | 12/2002 | Rhee | 370/465 |
| 2003/0043744 | A1 | 3/2003 | Lu et al. | 370/236 |

FOREIGN PATENT DOCUMENTS

EP    1143672 A2    2/2001

OTHER PUBLICATIONS

Transmission Control Protocol; Darpa Internet Program; Protocol Specification; Sep. 1981; Defense Advanced Research Projects Agency Information Processing Techniques Office; http://www.ietf.org/rfc/rfc0793.txt?number=793.
J. Postel, "Transmission Control Protocol," IETF RFC 793, Sep. 1981.
W. Stevens, "TCP Slow Start, Congestion Avoidance, Fast Retransmit, and Fast Recovery Algorithms," IETF RFC 2001, Jan. 1997.

* cited by examiner

*Primary Examiner*—David Wiley
*Assistant Examiner*—Phuoc H. Nguyen
(74) *Attorney, Agent, or Firm*—Chapin & Huang, LLC; David E. Huang, Esq.

(57) ABSTRACT

In a computerized device, a technique for communicating with an external transmission control protocol device involves operating in a stateless manner. In particular, the technique includes providing an acknowledgment message to the external transmission control protocol device in response to a synchronization message from the external transmission control protocol device, receiving a request message for content from the external transmission control protocol device, and sending, to the external transmission control protocol device, a reply message having at least a portion of the content, regardless of whether the computerized device received an acknowledgment message from the external transmission control protocol device in response to the acknowledgment message provided by the computerized device to the external transmission control protocol device.

14 Claims, 9 Drawing Sheets

SYSTEMS AND METHODS FOR PROVIDING TRANSMISSION CONTROL PROTOCOL COMMUNICATIONS

BACKGROUND OF THE INVENTION

Networks based on the transmission control protocol (TCP) enjoy widespread use. The reliability of the transmission control protocol makes it useful in numerous applications requiring precise multi-point communications. It is used for providing a common mode of communications for large and small computer systems in local area networks and wide area networks using a variety of communications and network communications facilities to provide a variety of services, notably, the internet, among others.

The transmission control protocol is a mature packet-based protocol for providing reliable process-to-process communications between networked computer systems. According to the protocol, each packet of a communication is started by the transmission of a packet containing a synchronization flag from a sending end to a receiving end. Reliability is achieved by assigning a sequence number to the packets and requiring an acknowledgment (ACK) to the packet received from the receiving end transmission control protocol device. The acknowledgment is transmitted to the original sending end, in response to the original transmission, then an acknowledgment to the original receiving end's acknowledgment is transmitted back to the receiving end to complete the cycle. Acknowledgments are used for the initial synchronization packet as well as for later packets requesting data transfer, the actual data transfer, and the ending signal.

At each end of the communication, the so-called "state" (the state of whether an acknowledgment has been received or not) is recorded and timed. If an acknowledgment is not received by the sending transmission control protocol device within a pre-set time-frame, the packet related to the absent acknowledgment is re-transmitted. Sequence numbers are used to re-order segments received out-of-order. In particular, timing and monitoring of acknowledgment reception at each end of the communication is a resource intensive computing function.

A typical transmission control protocol server design involves the use of multiple resources including random access memory, data storage, a processor or processors, and software capable of communicating with other transmission control protocol devices and transferring data. In addition to providing the minimal server operational functions, resource availability and capacity also plays an important role in determination of server performance. Consequently, as the number of clients and/or the volume of data provided to clients by a server is increased, server resources require expansion. Should the number of clients served or volume of data transferred become too great, server performance may be degraded, resulting in failed and/or slower connection and transfer speeds. Even in the case of clients requesting the transfer of small files, the sockets, as they are referred to, which provide applications with connections to a network, can overburden available resources. The ability of a server to adapt to increased workload demand resulting from an increase in the number of clients or the size and/or number of client requests is often referred to scalability.

SUMMARY OF THE INVENTION

Unfortunately, the system resource limitations of conventional transmission control protocol servers represent an opportunity lost in the implementation of numerous server and device designs.

For example, the resource requirements of the transmission control protocol make it difficult to provide simple, inexpensive devices which are capable of communicating with conventional transmission control protocol devices, even though they would be useful otherwise. Devices such as temperature or other transducers, gauges, simple appliances, to name a few examples, due to their size or other restricting factors, are typically subject to storage, memory, processor and/or other resource capacity restraints. This limits their ability to operate as conventional transmission control protocol devices. Even in the case of small devices equipped to provide the minimum resources necessary for conventional transmission control protocol-based communications, the devices may not be able to provide the necessary resources to be scaleable, that is, to meet the demands of an increase in the number of users or an increase in data transfer volume.

In a conventional transmission control protocol implementation, the server sets a timer upon transmission of a packet, then monitors acknowledgments received from the other end of the transmission control protocol communication. A table is maintained at the server in order to track each transmission and the time which has elapsed since the packet was transmitted.

When packets are received at the receiving end, the receiving transmission control protocol transmits an acknowledgment packet to the server. As a result of receiving an acknowledgment in connection with any particular packet received at the receiving end, the corresponding entries are removed from the server-based table. Any entries for which the elapsed time since transmission of the corresponding packet exceeds a predetermined amount of time cause the server to re-transmit the offending packet.

These steps require the expenditure of a lot of memory and processing resources that are used to maintain timers and state information, which can be particularly burdensome when supporting a high number of concurrent transmission control protocol connections. The consequence of this situation is a need for a high amount of overhead processing and conversely a limitation on throughput. In addition, these resource-related limitations reduce the practicality of simple devices operating as servers.

In contrast, the invention is directed to techniques for implementing a transmission control protocol server having stateless capabilities. As such, the server can operate without maintaining timers and/or a table of packets transmitted to the client. As a result, computing resource utilization at the computerized device can be reduced, leading to improved computerized device performance with increasing numbers of clients and also leading to increased volume and improved scalability over the conventional transmission control protocol.

Because of its simplicity, the server is also well-suited to implementation in the form of simple devices such as small embedded computational devices, measuring tools, etc. which are only capable of providing limited computational resources. Also, providing the capability to eliminate the state maintenance functions of the server, normally performed as part of conventional transmission control protocol communications, eliminates one avenue of possible attack vulnerability.

According to the embodiment of the invention, the computerized device (or content provider) simply responds to acknowledgments of packets (hereafter referred to by the more generalized term messages) sent from the client. First, the content provider responds with an acknowledgment to a packet flagged as a synchronization packet. Then it responds to a request for transmission of content with transmission of the first segment of content. If there are additional segments of content to be transmitted, the content provider responds to acknowledgment numbers received from the client, which represent the number of the last segments received by the client, by sending the next segment, in sequence, due to be transmitted. The content provider does not have to update a table or set timers, unlike the situation that exists for the conventional transmission control protocol.

Each time the content provider receives a message with an acknowledgment number indicating the last segment received, it compares the cumulative size of the segments received by the client to the content size being transmitted, in order to determine if transmission of the file has been completed. In the case of a small file of one segment, transmission is ended.

By transmitting the acknowledgment number of the segment of content last received at the client, the client provides notification to the computerized device of the next segment due to be transmitted. The client, alone, can maintain timers to identify whether a predetermined time has elapsed between the time it sends a message with any particular acknowledgment number and the time it receives the next segment expected from the computerized device, in response. If the expected segment does not arrive at the client within the predetermined time, the client re-sends, over and over again if necessary, the same acknowledgment number in order to cause a transmission of the desired segment until the transmission is successful.

After the content provider identifies that transmission of the desired file has been completed, it transmits a message to the client flagged as finished (FIN) in order to notify the external transmission control protocol device that the transmission is finished.

In one embodiment, the invention provides a method for communicating with an external transmission control protocol device (e.g., a transmission control protocol client), including providing an acknowledgment message, to the external transmission control protocol device in response to a synchronization message from the external transmission control protocol device, receiving a request message for content from the external transmission control protocol device, and sending, to the external transmission control protocol device, a reply message having at least a portion of the content, regardless of whether the computerized device received an acknowledgment message from the external transmission control protocol device in response to the acknowledgment message provided by the computerized device to the external transmission control protocol device. By processing the request with or without having received an acknowledgment, the acknowledgment processing and the record keeping necessary to track acknowledgment reception is reduced.

In another embodiment of the invention, the method includes the step of transmitting the reply message to the external transmission control protocol device in response to a request message from the external transmission control protocol device and in the absence of receiving the acknowledgment message from the external transmission control protocol device. For example, in one implementation of the invention, the external transmission control protocol device may send an synchronization message to the computerized device, whereupon the computerized device acknowledges the synchronization message from the external transmission control protocol device. At that point, receiving only a request message for content, the computerized device immediately sends a reply message with at least a segment of content. The computerized device doesn't maintain state information, reducing the resource burden on the computerized device.

In another embodiment of the invention, the method includes transmitting the reply message to the external transmission control protocol device in response to the request message from the external transmission control protocol device in the absence of establishing a transmission control protocol connection. This method provides an elegant technique for achieving communications with very simple server devices, creating a wide variety of newly feasible servers and devices interfacing to other transmission control protocol and transmission control protocol-like devices.

In another embodiment of the invention, the method includes transmitting a content segment and also includes comparing an acknowledgment number received from the external transmission control protocol device to an aggregate size of the content to be transmitted. When the acknowledgment number is greater than or equal to the aggregate size of the content to be sent, the computerized device refrains from sending another content segment; when the acknowledgment number is less than the size of the aggregate content, the computerized device sends another content segment. This method reduces the processing that would otherwise be required for the computerized device to identify completion of transmission.

In another embodiment of the invention, all files transmitted are sufficiently small that they are capable of being transmitted within one file segment.

According to another embodiment, acknowledgment messages and the associated acknowledgment numbers received from the external transmission control protocol device, in response to reply messages, are queued prior to the step of comparing the acknowledgment numbers to the aggregate size of the content. For example, the computerized device may receive multiple acknowledgment number responses from a external transmission control protocol device before having had time to process transmission of content segments in response to the messages from the external transmission control protocol device. The computerized device saves acknowledgment number response messages in a queue and processes them in order, rather than delay receiving further acknowledgment number response messages until all of the previously received response messages have been processed.

In another example, when the external transmission control protocol sends multiple repeat acknowledgment messages due to content segment transmissions having failed, the messages may be queued according to an algorithm which combines similar acknowledgment messages to eliminate duplicate processing.

In another embodiment, the invention is directed to a method for communicating with a computerized device (e.g., a content provider), including sending to the computerized device a message requesting content and an acknowledgment number indicating an amount of content previously received by the transmission control protocol device from the computerized device and starting a timer. When the transmission control protocol device receives content from the computerized device before the timer indicates a predetermined amount of time has expired, the client increments an initial acknowledgment number by a size of a received segment of content to form a new acknowledgment number and sends an acknowledgment message and the new acknowledgment number to the computerized device. When the transmission control protocol device does not receive content from the computerized device before the timer indicates that the predetermined amount of time has expired, the transmission control protocol device re-sends the acknowledgment message and the initial acknowledgment number.

Another embodiment includes the step of re-starting the timer after the transmission control protocol device again does not receive the content from the computerized device and the timer indicates that the predetermined amount of time has expired and re-sending the acknowledgment message and initial acknowledgment number to the computerized device. Accordingly, if a content segment is not received due to transmission failure in either direction, the computerized device is prompted to re-send the sought-after content segment. In that way, the overhead burden for management of re-transmission is re-distributed from the computerized device to all of the transmission control protocol devices involved in content transfers.

In still another embodiment, the transmission control protocol device or client is a conventional transmission control protocol client. According to the embodiment, the computer system, which is also capable of processing other operating system, application or other software is set up so that when the conventional transmission control protocol client does not receive content from the computerized device before the timer indicates that the predetermined amount of time has expired, an application process also operating on the system causes the conventional transmission control protocol client to transmit a payload which forces the conventional transmission control protocol client to re-send the acknowledgment message and the initial acknowledgment number.

Another embodiment is a storage medium having instructions stored thereon such that, when the instructions are carried out by a computational device, the computational device is capable of providing an acknowledgment message to an external transmission control protocol device in response to a synchronization message from the external transmission control protocol device, receiving a request message for content from the external transmission control protocol device, and sending, to the external transmission control protocol device, a reply message having at least a portion of the content, regardless of whether the computerized device received an acknowledgment message from the external transmission control protocol device in response to the acknowledgment message provided by the computerized device to the external transmission control protocol device. This embodiment also provides the previously mentioned advantages of reduced burden on computerized device resources, simplicity, scalability and attack resistance.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

The invention is directed to techniques for communicating between a computerized device (a content provider) which is capable of operating as a server having stateless capabilities and an external transmission control protocol device (e.g., a transmission control protocol client). The techniques employ many of the steps performed in a conventional transmission control protocol but vary from the conventional transmission control protocol, in particular, by virtue of the fact that no information about the state of packet or message transmission needs to be maintained within the content provider. In lieu of maintaining such information, the content provider accepts acknowledgment numbers from the external transmission control protocol device which notify the content provider which is the next content segment (otherwise referred to as segments of a file) due to be sent or re-sent to the external transmission control protocol device. Accordingly, computational resource requirements of the content provider are reduced, thereby improving performance of the device when used with larger numbers of users. Furthermore, the techniques provide increased volume of data transmission as well as improvements in scalability, added simplicity, robustness and decreased vulnerability to system attack.

Figure 1:
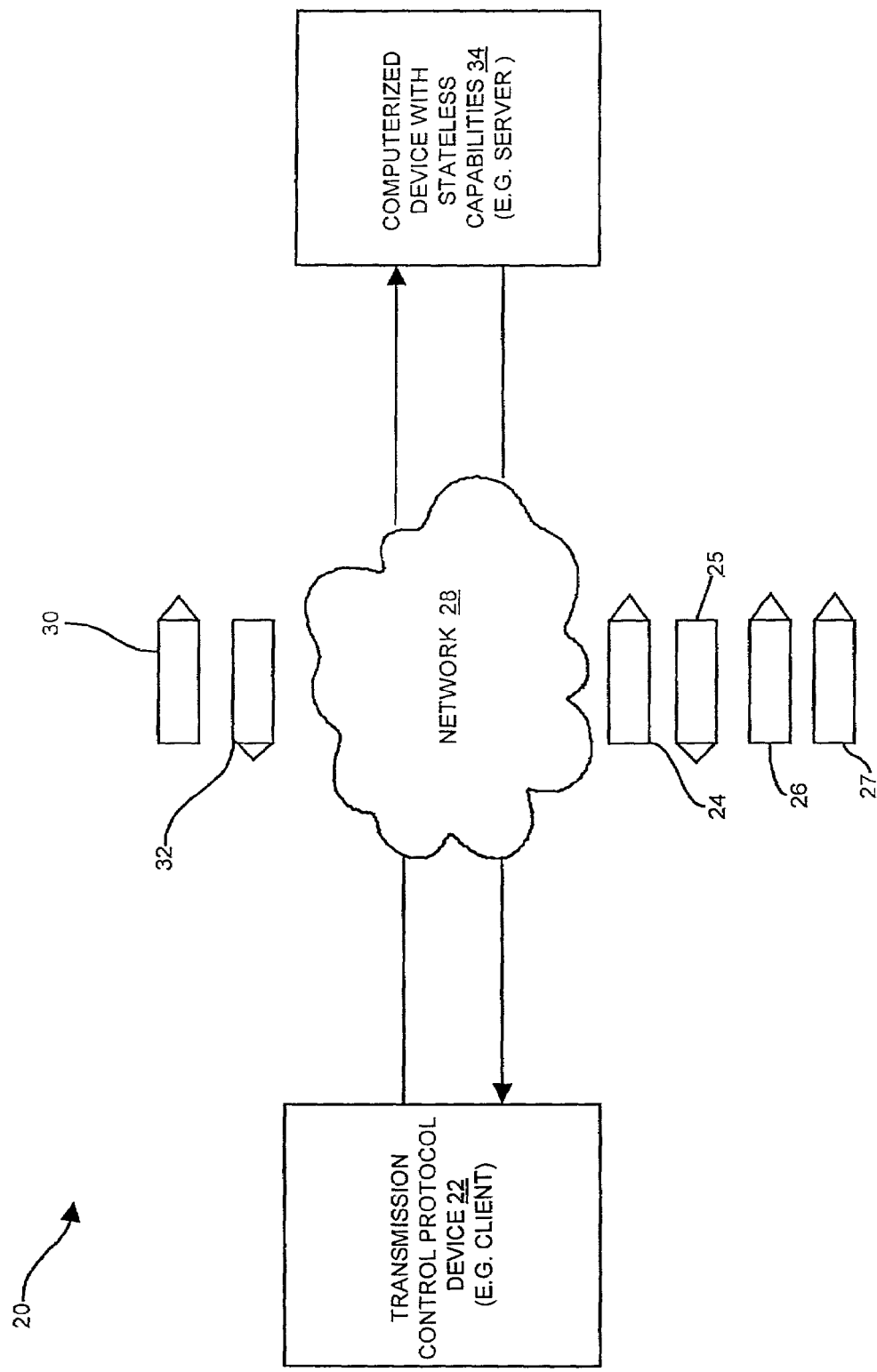
FIG. 1 shows a computer system which is suitable for use by the invention.
Figure 2:
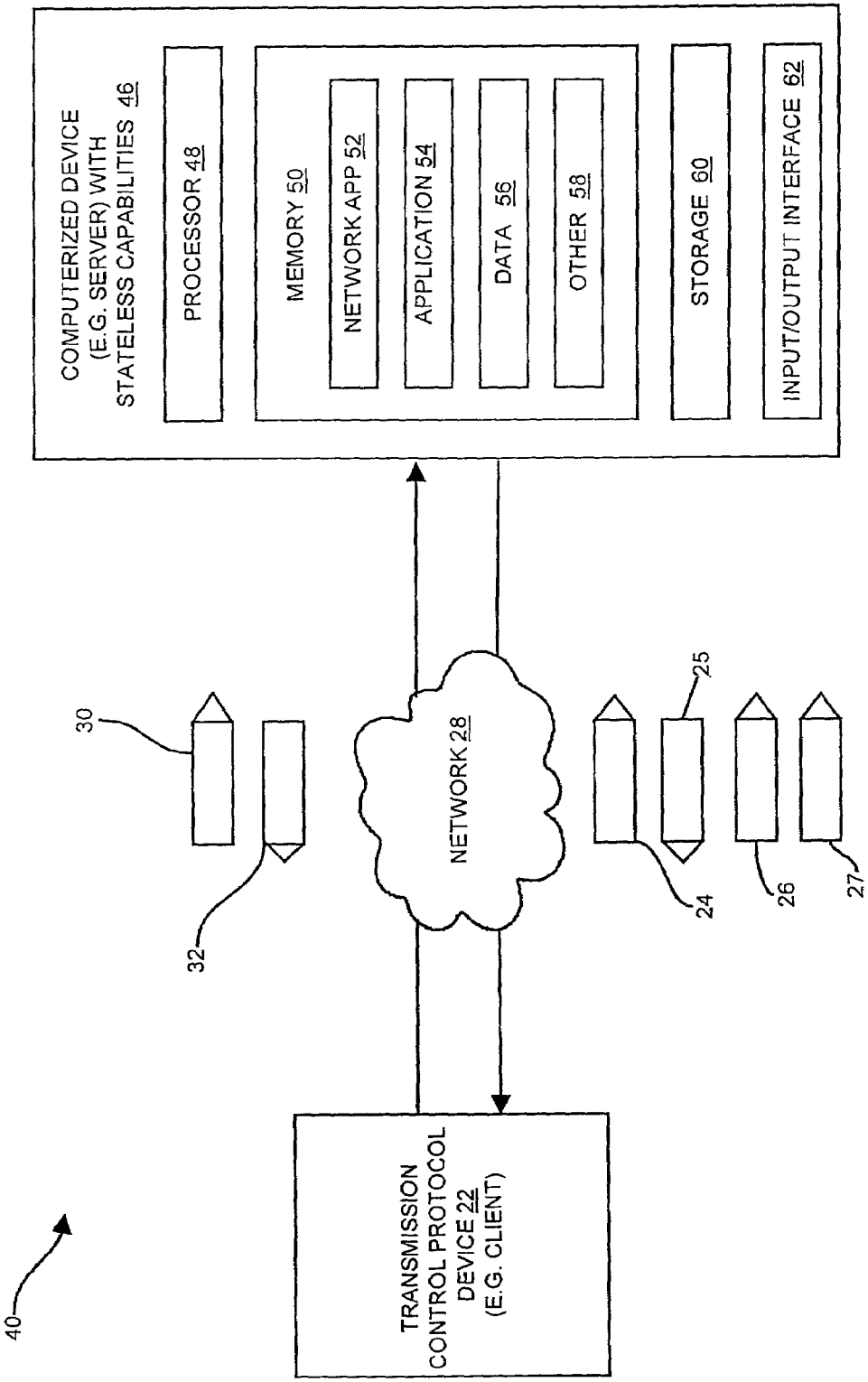
FIG. 2 shows the computer system of FIG. 1 having, as a computer device which communicates with a transmission control protocol device, a computerized device having a general purpose computer configuration.
Figure 3:
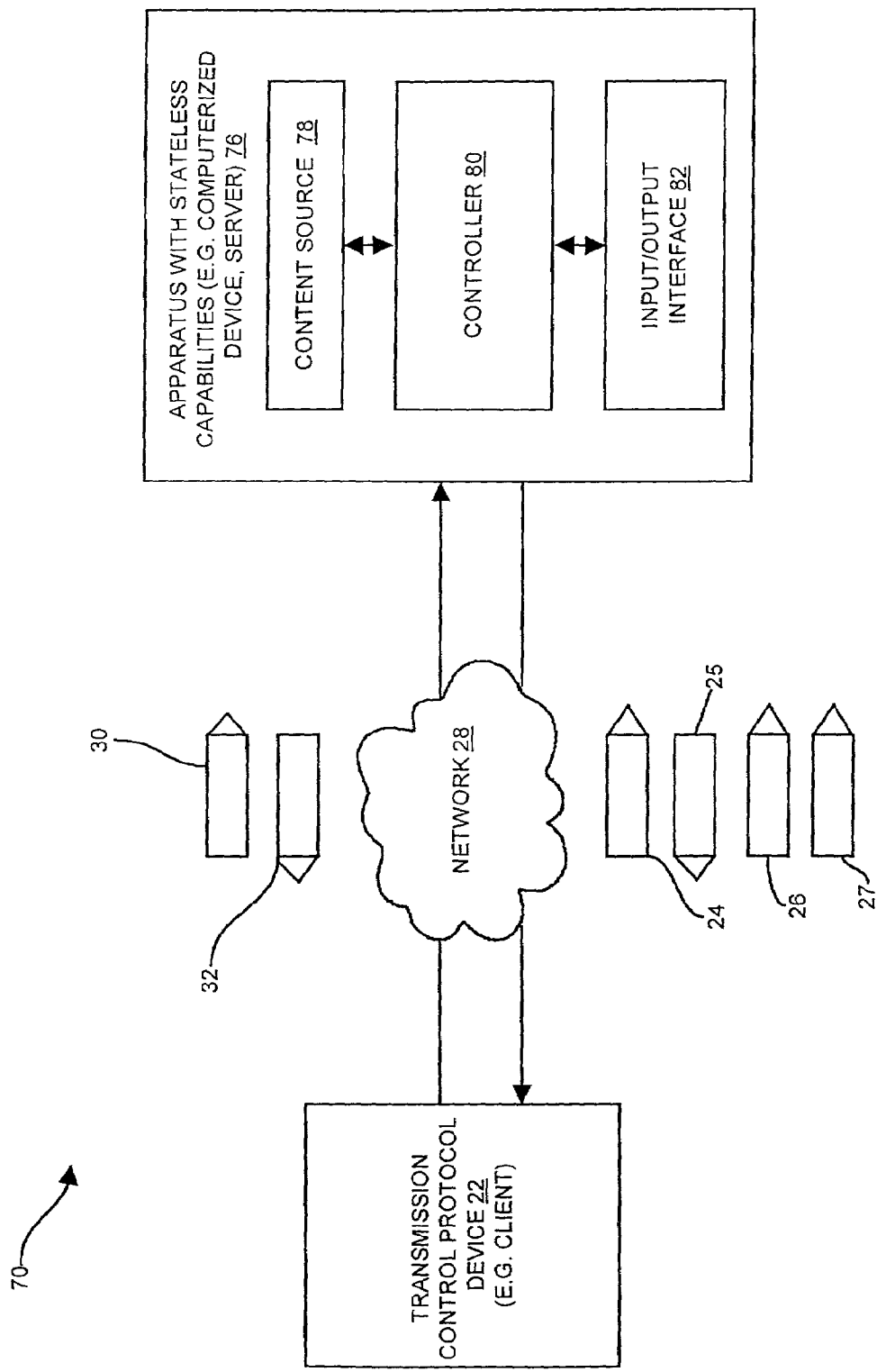
FIG. 3 shows a computerized device having an alternative configuration to that of FIG. 2.

FIG. 1 shows a system 20 with components that are suitable for use by the invention. The system 20 includes an external transmission control protocol device or client 22, a network 28, and a content provider with stateless capabilities or content provider 34 and various packets or messages including a synchronization message 24, an acknowledgment message to the synchronization message 25, an acknowledgment to the acknowledgment message 26, an additional message 27, a request for content 30 and a reply message 32 including content. The layout of the system 20 is provided by way of example only, and other configurations are suitable. For example, FIGS. 2 and 3 show other embodiments of the invention in which the content provider with stateless capabilities 34 can be either a complex device such as a general purpose computer 46 or a simple device such as a simple embedded microprocessor, etc. 76.

The external transmission control protocol device 22 and computerized device or content provider communicate in both directions between each other over the network 28. Typically, the network communicates using a transmission control protocol though aspects of the invention are also applicable to other transmission methods as well.

The external transmission control protocol device 22 may be any of a variety of sizes and types of computational devices capable of sending and receiving communications over a network or other communications media and processing it, most typically, but not necessarily, a computer of some sort. Such computers are often general purpose computer systems such as personal computers, work stations, mini computers, mainframes and the like, or they may be dedicated servers such as web site kiosks, facsimiles servers, video servers, audio servers and so forth.

The external transmission control protocol device 22, sometimes referred to as a client, initiates communications by transmitting a synchronization message 24, via the network 28 to the computerized device or content provider 34. The synchronization message 24, as do the later messages 25–32, contains a variety of transmission information used in connection with the transfer of data. The transmission information is most typically found in packet headers and may be handled in any of variety of ways including storing data within header fields, flagging the packets, setting and reading selected data bits, etc. Much of the transmission information, while important to the transmission of data over networks, does not vary from established methods of network communications except in the manner in which the information is obtained.

In the computerized device 34 with stateless capabilities, unlike the case of the conventional transmission control protocol, such transmission information can be obtained from the messages received earlier from the external transmission control protocol device 22 rather than from tables maintained on the computerized device 34 as in the case of a conventional transmission control protocol. In effect, transmission information is generated with current information rather than from prior state information recorded and maintained by the computerized device 34 as would occur in the case of a conventional transmission control protocol. For example, a sequence number, which is sent by the computerized device 34 to the external transmission control protocol 22 to represents the segment being sent by the computerized device 34 to the external transmission control protocol device 22, is obtained from the acknowledgment number sent earlier by the external transmission control protocol device 22 to the computerized device 34.

Other transmission information such as source and destination, port numbers, other transmission control protocol and internet protocol header information, etc. can also be obtained from the earlier-received messages.

FIG. 2 demonstrates a content provider 46 such as a computer (of any size or complexity) including personal computers, mini and mainframe computers to name just a few examples. The content provider 46 includes a processor 48, random access or other memory mechanism 50 capable of storing system, application programs, data, etc. 52–58, a storage mechanism 60, input-output mechanism 62 and a processor 48 for performing computations. The content provider 46 may be dedicated to operation of the embodiment of the invention or operate in conjunction with other simultaneous or time-shared functions on the same device. The embodiment also includes an external transmission control protocol device or client 22, a network 28, and a content provider with stateless capabilities or content provider 34 and various packets or messages including a synchronization message 24, an acknowledgment message to the synchronization message 25, an acknowledgment to the acknowledgment message 26, an additional message 27, a request for content 30 and a reply message including content 32 which operate in an equivalent fashion to that described in FIG. 1.

Alternatively, FIG. 3 demonstrates a version of the invention using a simple content provider or apparatus 76 including a content provider 78 of information for transmission, a controller 80 to control and process the information and an input/output interface 82 for communication of content. The other components 22–32 reflect the same configuration and use as described in FIGS. 1 and 2.

The embodiment of the invention shown in FIG. 3 envisions any of a large variety of different types of simple devices performing any of variety of functions such as data collection, collection and processing of information, etc. For example, an embodiment of the invention may be connected to or part of a temperature gauge or other transducer, an embedded microprocessor, a simple processor, etc. such as one that collects data and transmits it to an external transmission control device 22 for processing. Such simple devices, as the invention makes possible, opens up a world of possible applications of the invention.

Figure 7:
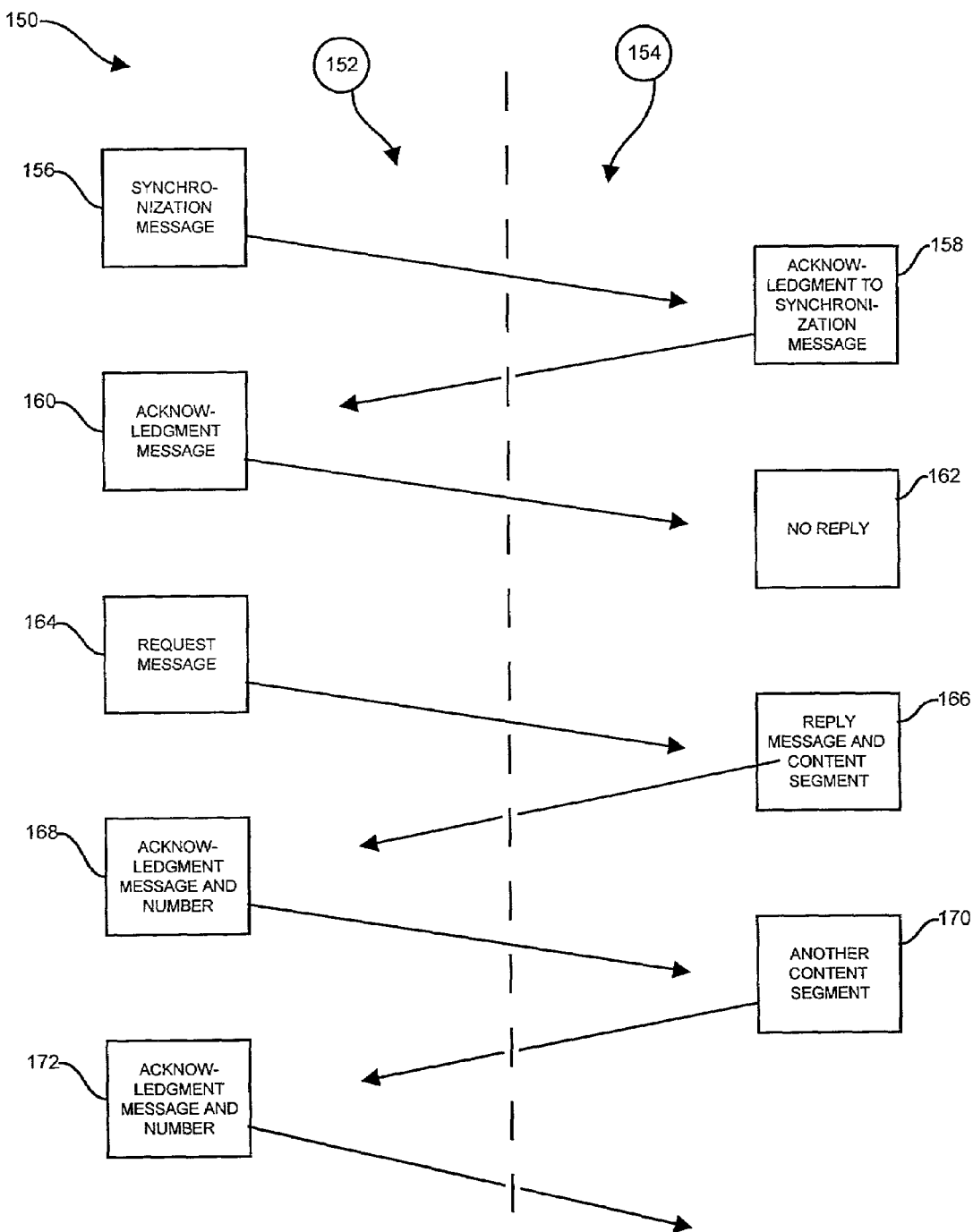
FIG. 7 depicts the communication of messages and content between the computer system, computer device, computerized device, and client of FIG. 1–3.

FIG. 7 depicts the communication of messages and content between the external transmission control protocol device and content provider 150. It provides a time sequence point of view of messages exchanged between the devices. The messages shown are similar to the messages depicted in FIGS. 1–3 except that they do not include the additional message 27 shown in FIGS. 1–3 for the purpose of comparing the embodiment of the invention to a conventional transmission control protocol device. They include a synchronization message 156, an acknowledgment message to the synchronization message 158, an acknowledgment to the acknowledgment message 160, a non-reply 162, an request message 164, a reply message and content segment 164, and additional acknowledgment messages, numbers and content segments 166–172. The origin and destination of the messages, that is, the external transmission control protocol 152 for messages 156, 160, 164, 168, and 172 and the content provider 154 for messages 158, 162, 166 and 170 are also depicted. Understanding of the exchange of messages is best understood by discussing the detail of operations of the embodiment of the invention, as outlined in the following flow charts.

Figure 4:
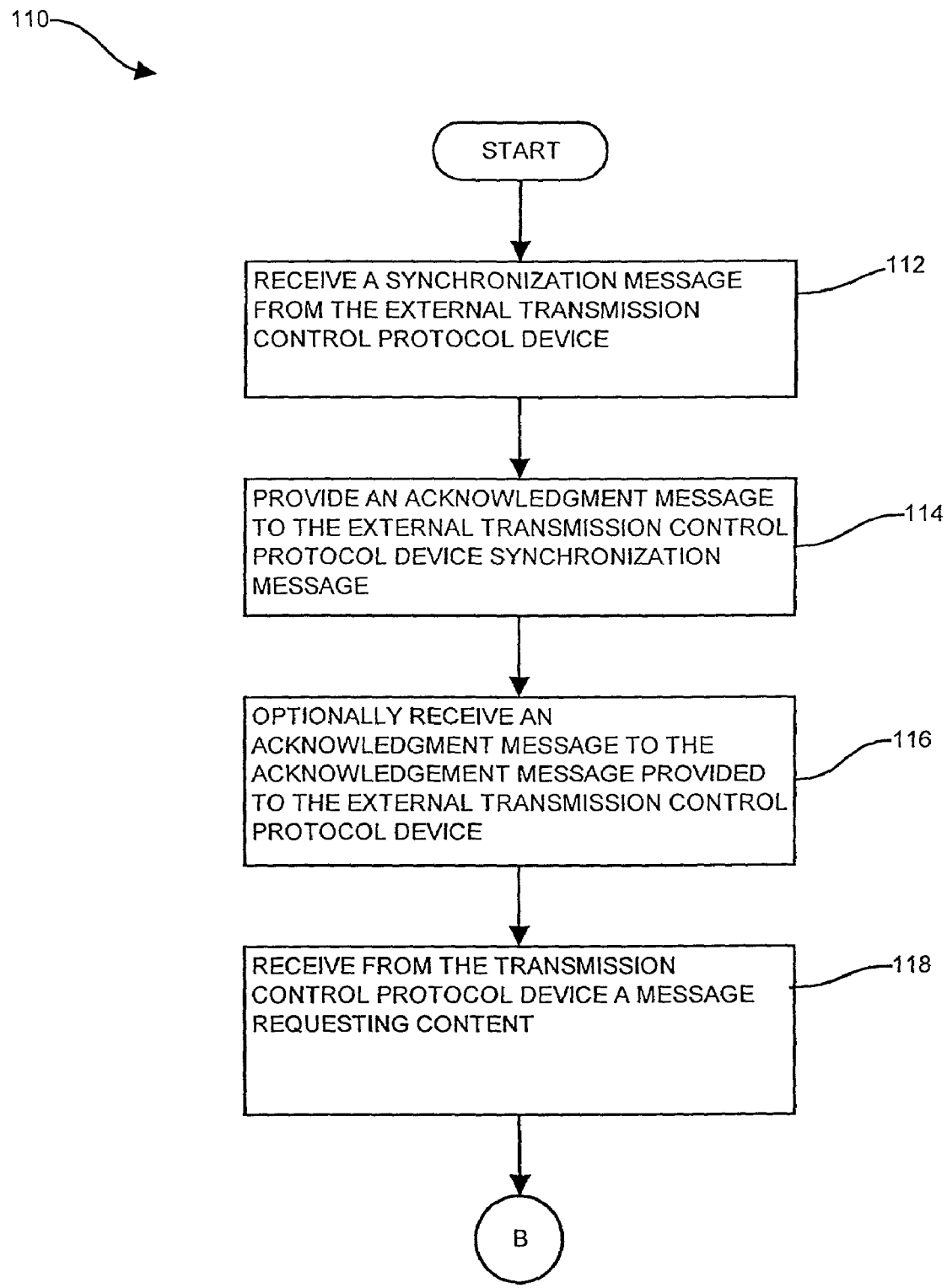
FIG. 4 is a flow chart of a portion of a procedure performed by the computer system, computer device, or computerized device of FIGS. 1–3 and 8.

FIG. 4 is a flow chart of a portion 110 of the procedure performed by a content provider which primarily includes reception of the initial messages up to receiving the request for content. In step 112, the content provider receives a synchronization message from the external transmission control protocol device. In step 114, the content provider provides an acknowledgment message to the external transmission control protocol device synchronization message. In step 116, the content provider optionally receives an acknowledgment message to the external transmission control protocol device's acknowledgment message. In step 118, the content provider receives a request for content from the external transmission control protocol device.

Accordingly, the content provider 34, sometimes referred to as a server, receives a synchronization message 24 (step 112) which is transmitted via the network 28 from the external transmission control protocol device 22. After the synchronization message 24 is retrieved by the content provider 34, it responds to the synchronization message 24, by transmitting an acknowledgment message (to the synchronization message 24) 25, over the network 28 to the external transmission control protocol device 22 (step 114).

In a conventional transmission control protocol device, reception 112 of the synchronization message 24, 156 at the content provider 34 alerts the content provider to begin the computational processes necessary for monitoring and management of messages transmitted from the client. However, in the embodiment of the invention, the content provider 34 is not required to perform the same management of messages transmitted from the external transmission control protocol device 22 that is performed by the equivalent of the content provider in a conventional transmission control protocol. In fact, unlike the conventional transmission control protocol, the embodiment of the invention does not require the synchronization message 24, 156 and/or acknowledgment to the synchronization message 25, 158.

Accordingly, the content provider 34 is capable of returning a reply message including content 32, 166 responding to a request for content 30, 164, without receiving a prior synchronization message 24, 156 and acknowledgment to the synchronization message 25, 158. In embodiments of the invention that use a synchronization message 24, 156 and/or an acknowledgment to the synchronization message 25, 158, their primary purpose is to provide an effective interface within implementations using conventional transmission control protocol or conventional transmission control protocol-like procedures. Either of these steps may or may not be included in embodiments of the invention.

By returning the acknowledgment to the synchronization message 25, 158 to the external transmission control protocol device 22 (step 114), the content provider 34 notifies the external transmission control protocol device 22 of reception of the synchronization message 24, 156 and that the content provider 34 is ready for the next step of the communication. Upon receipt of the acknowledgment to the synchronization message 25, 158, the external transmission control protocol device 22 may optionally send 116 a further acknowledgment 26, 160 to the content provider 34, thereby acknowledging the fact that the external transmission control protocol device 22 is ready for the next step in the process of communicating between both devices. The external transmission control protocol device 22 may send one additional message 27 to the content provider 34, to which the content provider 34 does not respond 162. These last two steps, the external transmission control protocol device 22 sending an acknowledgment to the acknowledgment to the synchronization message 26, 160 and sending one additional message 27 to the content provider 34 are typically provided in the embodiment of the invention for the purpose of maintaining compatibility with procedures followed by a conventional transmission control protocol or conventional transmission control protocol-like protocol. However, just as in the case of the synchronization message 24, 156 and the acknowledgment to the synchronization message 25, 158, they are not required for operation of the invention. However, as described earlier, the embodiment of the invention will accept them also for purpose of maintaining compatibility with a conventional transmission control protocol or conventional transmission control protocol-like protocol.

It should be understood, that various embodiments of the invention are capable of returning a reply message including content 32, 166 based on receiving any of a variety of combinations of the synchronization 24, 156, acknowledgment to the synchronization 25, 158, acknowledgment to the acknowledgment 26, 160, and additional messages 27 or none at all as described earlier. In one example of an embodiment of the invention, none of the previously described initial messages are used; the first message is sent from the external transmission control protocol device, is the request for content 30.

In the case of all of the different embodiments of the invention, whether they include any, all or none of the initial messages, the content provider 34 receives a message requesting content 30, 164 from the external transmission control protocol device 22 (step 118). Upon receipt of the message requesting content 30, 164 from the transmission control protocol device 22 (step 118), the content provider 34 analyzes the request for content 30, 164.

Depending on which of the alternative embodiments of the invention is used, the request for content 30, 164 received may or may not include an acknowledgment number (step 118). In one embodiment of the invention, in which only single segment files are transferred, "zero" may be used for an acknowledgment number or an acknowledgment number may not be included. In an embodiment of the invention capable of transferring files made up of multiple segments, an acknowledgment number is typically included as part of a request for content 30, 164. In that case, the initial acknowledgment number is arbitrarily chosen at the beginning of communication between an external transmission control protocol device 22 and a content provider 34.

After sending the initial request for content 30, 164, to the content provider 34, the external transmission control protocol device 22 may re-send the request for content 30, 164, repeating the prior acknowledgment, as will be described in more detail, later.

Figure 5:
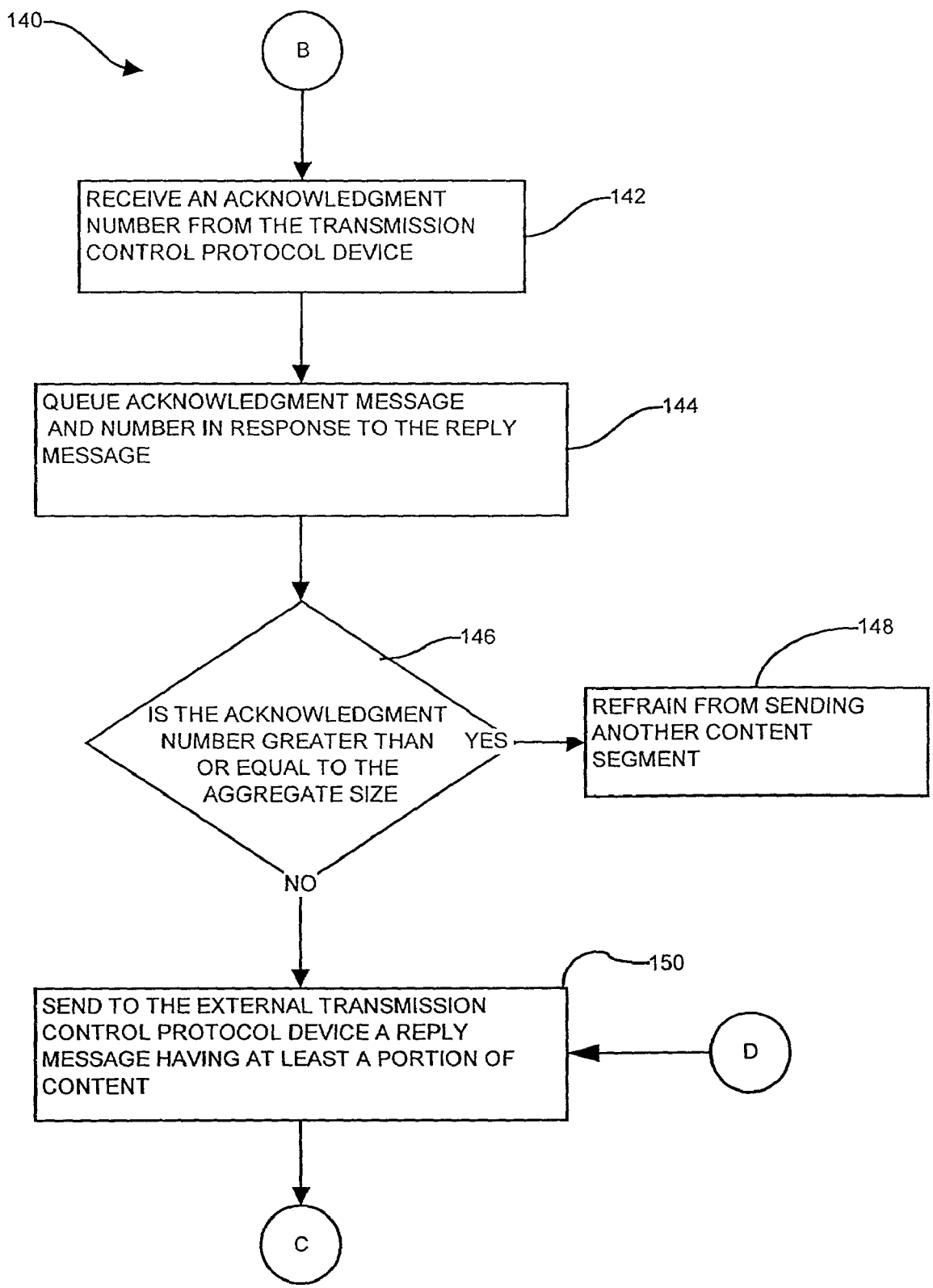
FIG. 5 is a flow chart of another portion of the procedure involving acknowledgment message and number processing performed by the computerized device of FIGS. 1–3 and 8.

FIG. 5 is a flow chart of a procedure 140 which is performed by the content provider. In step 142 the content provider receives an acknowledgment number from the external transmission control protocol device. In step 144, acknowledgment messages and numbers are queued. In step 146, the content provider determines whether an acknowledgment number is greater than the aggregate size of the file being transmitted and either sends (step 150) or refrains from sending an additional content segment (step 148). In some embodiments of the invention in which all files transmitted are able to fit within one file segment, such processing can be reduced.

Acknowledgment numbers inform the content provider 34 which segment is due to be transmitted. The acknowledgment number is a number that represents the cumulative file size of segments of files received up to that point by the transmission control protocol device 22. Each file segment received (step 142) by the transmission control protocol device 22 is compared to the previous acknowledgment number sent to the content provider 34, in order to determine if it is the next segment due to be received.

When an acknowledgment number is received (step 142) by the content provider 34 from the external transmission control protocol 22, the content provider 34 determines whether the acknowledged number received is greater than or equal to the aggregate size of the file in the process of being transmitted. If it is, it is not necessary to send any further file segments (step 148). If the acknowledged number is smaller than the size of the file being transmitted (step 146), then transmission has not been completed and the content provider 34 continues (step 150) file transmission.

The embodiment of the invention includes a mechanism for dealing with any backlog of processing which may occur at the content provider 34. Accordingly, the processing of requests for content 30, 164 including acknowledgment numbers, received by the content provider 34 may be treated as a queued process (step 144). Once queued, the content provider 34 processes requests for content and acknowledgment numbers held in the queue, in order. This allows for the continued reception of messages from the transmission control protocol device 22, even if the content provider 34 is unable to remain up-to-date in processing the acknowledgment numbers and sending file segments to the external transmission control protocol device 22.

After determining that an acknowledgment number received from the transmission control protocol device (step 142), is less than the aggregate file size of a file being sent (step 146) by the content provider 34, the content provider 34 will send a file or segment of file 32, 166 to the external transmission control protocol device 22. The choice of which segment for the content provider 34 to send is effectively determined by which segments have been received by the external transmission control protocol device 22 as signified by the acknowledgment number sent to the content provider 34.

Figure 6:
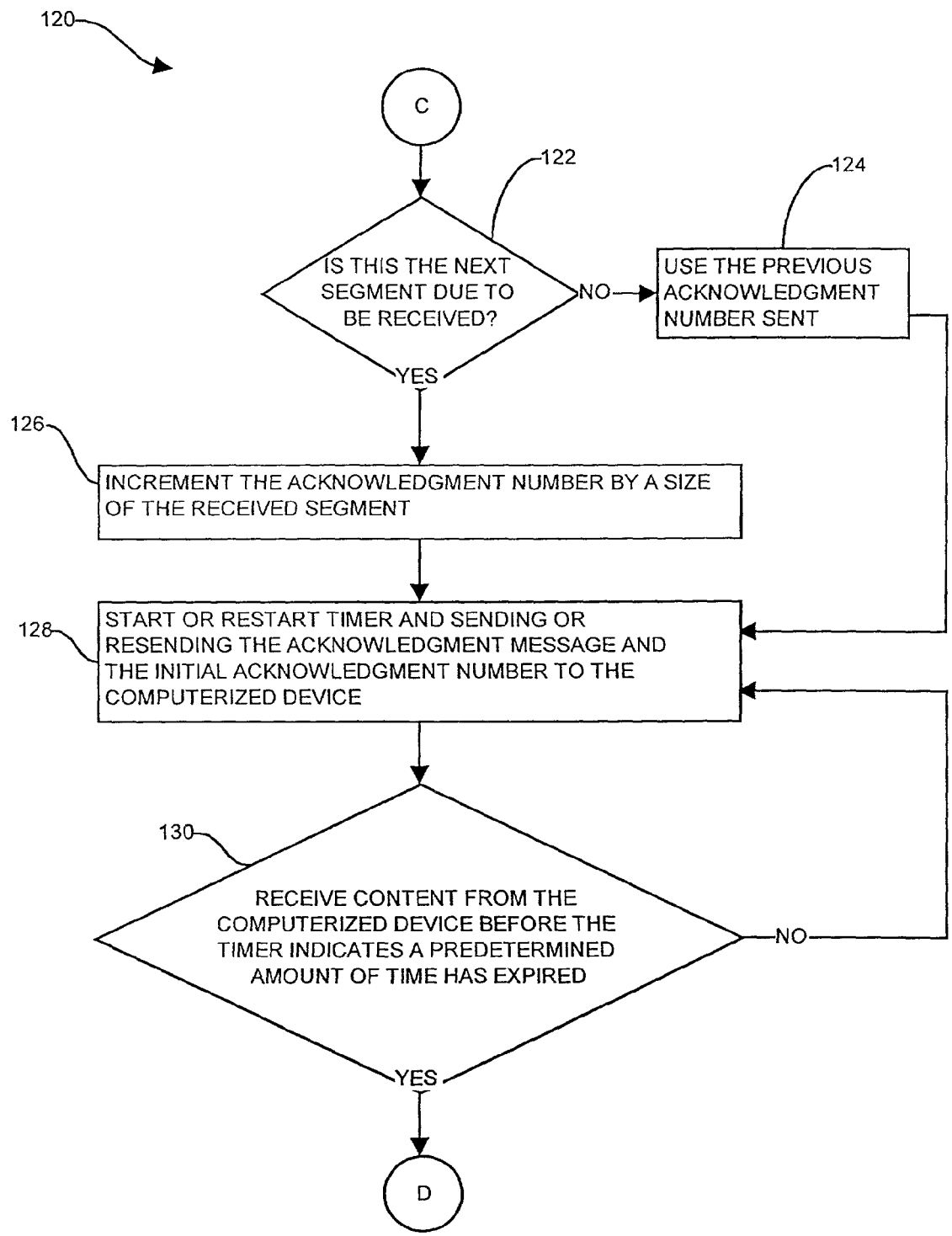
FIG. 6 is a flow chart of another portion of the procedure involving acknowledgment number processing performed by the external transmission control protocol device of FIGS. 1–3 and 8.

FIG. 6 is a flow chart of a procedure 120 performed by the external transmission control protocol device 22. In step 122, the external transmission control protocol device tests to see if the received segment is the next segment due to be received. If it is the next segment, in step 126, the external transmission control protocol device increments the acknowledgment number by the size of the received segment. If not, in step 124, it re-uses the previously used acknowledgment number. In step 128, the external transmission control protocol device starts a timer and sends the acknowledgment message and initial acknowledgment number to the content provider. In step 130, the external transmission control protocol device tests to determine if content has been received before expiration of the timer.

To select the next segment for transmission by the content provider 34, in step 122, the external transmission control protocol device 34 determines if the segment most recently received is the next segment following the aggregate size of the file segments received to that point. If so, in step 126, the external transmission control protocol device 22 will increment the acknowledgment number by the size of the segment just received. This will cause the content provider to send the next file segment. If the segment most recently received is not the next segment following the aggregate size of the file segments received to that point, in step 124, the external transmission control protocol device 22 will re-send the previously sent acknowledgment number to the content provider 34, effectively requesting that the segment be re-sent by the content provider 34. Accordingly, any segment is caused to be re-sent after a failed transmission, as many times as it takes until it has been received by the external transmission protocol device 22.

Upon sending an acknowledgment message and initial acknowledgment number to a content provider 34, the external transmission control protocol device 22 sets a timer (step 128) to a predetermined amount of time. The predetermined amount of time represents the maximum time expected for the combination of the acknowledgment message and acknowledgment number to be sent to and received by the content provider 34, the queuing of acknowledgments (step 144) and other processing of the reply message containing a file or portion of a file 32, 166 by the content provider 34, and, finally, the reception of the reply message 32, 166 by the external transmission control protocol device 22.

If the timer expires before reception of the desired content or file segment, the timer is reset and the acknowledgment message and acknowledgment number is re-sent to the content provider 34 as previously described, over and over again as many times as is required for transmission of the segment to be successful. For example, if the transmission of messages (typically packets) over the network 28 is poor and results in any request for content 30, 164 failing to reach the content provider, 34 or results in replies to the requests 32, 166 from reaching the external transmission control protocol device 22, the timer will expire and cause re-transmission (steps 122–130) of the segment represented by the same acknowledgment number to the content provider 34. This will be repeated over and over again until the desired segment has been received. The method ensures the reception of all file segments.

As a consequence of managing segment transmissions in this way, the function of setting and tracking of timers, maintaining tables to track receipt of segments and comparing them to newly received segments are conducted by the transmission control protocol device 22. The content provider 34 is not required to process or store such information, but just respond to information received from the external transmission control protocol device 22. The effect is to minimize the computational and storage requirements for the content provider 34.

It may, under certain circumstances, be desirable to use a conventional external transmission control protocol device to implement the invention. This can be accomplished, despite the differences in operation which exist between the conventional transmission control protocol device and the embodiments of the invention using a modified external transmission control protocol.

It should be understood that even though the embodiment of the invention may maintain some or all of the synchronization and acknowledgment messages used in a conventional transmission control protocol, in contrast, the steps of tracking received segments and re-sending acknowledgment numbers in order to instigate the re-sending of replies differs from the conventional transmission control protocol.

In order to implement an embodiment of the invention using a conventional transmission control protocol, a payload can be transmitted via the conventional external transmission control protocol device in order to cause the external control protocol device to send a message with a repeat acknowledgment number to the content provider. The content provider can then use the acknowledgment number as a basis for re-sending the appropriate file segment.

Figure 8:
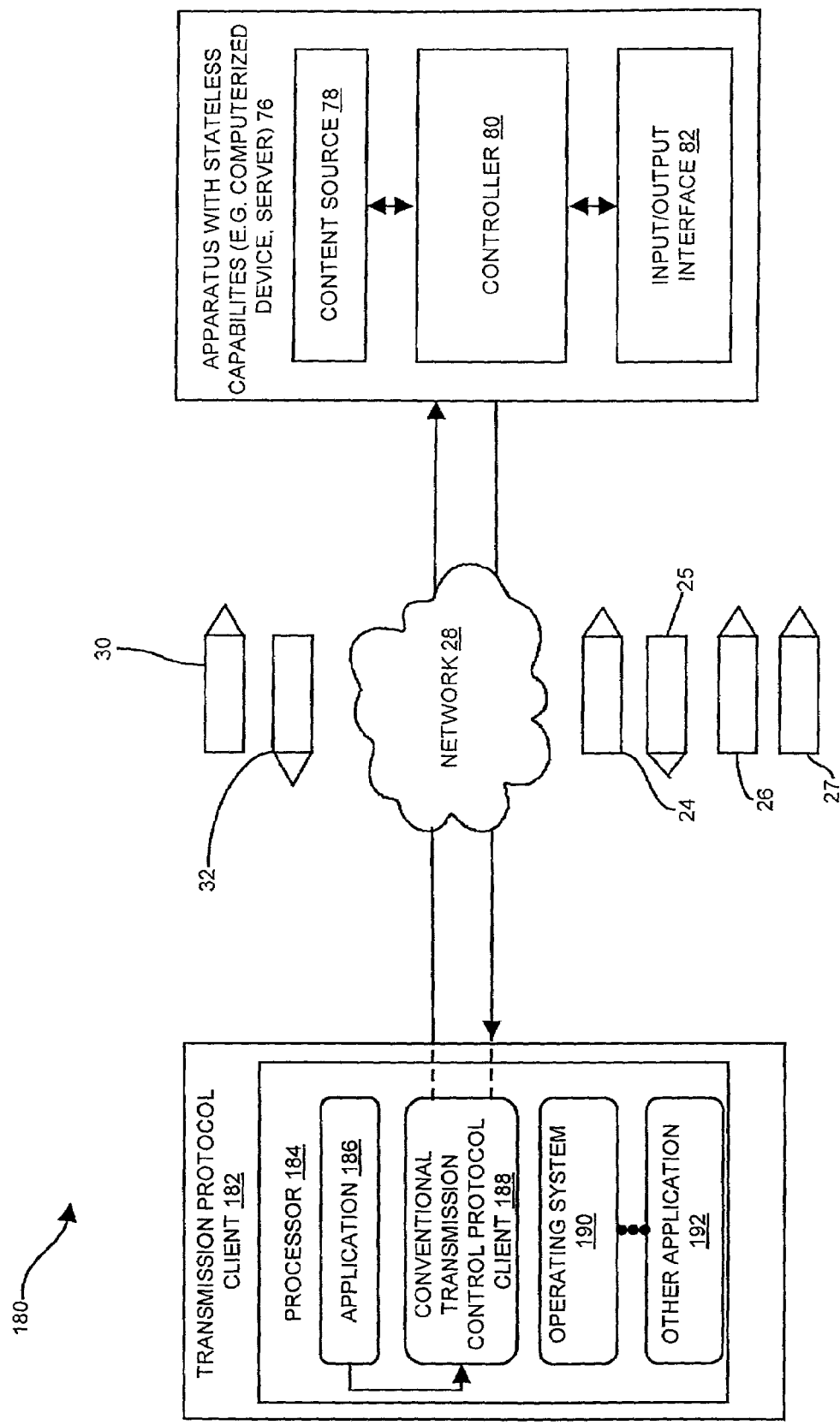
FIG. 8 shows a computer system suitable for using an independent process to generate a payload for transmission by a conventional transmission control protocol client.

FIG. 8 shows an embodiment of the invention using such a payload to transmit a repeat acknowledgment number via a conventional transmission control protocol to the content provider 180. It includes a transmission protocol client 182, having a processor 184, an application program 186, a conventional transmission control protocol client 188, and possibly an operating system 190, other applications or programs 192, etc. as well as the an external transmission control protocol device or client 22, a network 28, and a content provider with stateless capabilities or content provider 34, various packets or messages including a synchronization message 24, an acknowledgment message to the synchronization message 25, an acknowledgment to the acknowledgment message 26, an additional message 27, a request for content 30 and a reply message 32 including content as described in FIG. 1–3.

Figure 9:
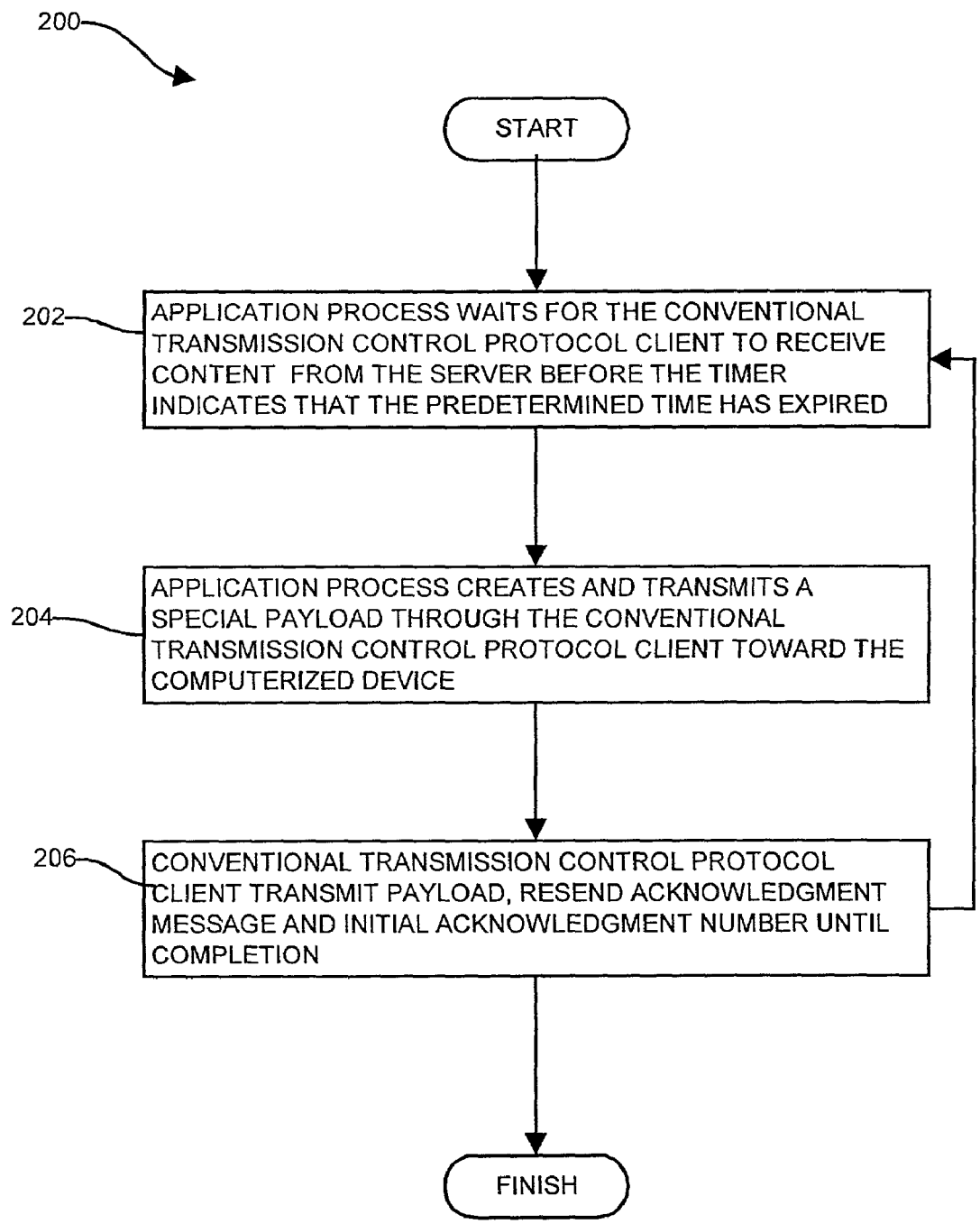
FIG. 9 is a flow chart of the procedure performed by an independent process and a conventional transmission control protocol client of FIG. 8.

FIG. 9 is a block diagram describing the steps of the configuration of the invention using a special payload 200 that includes an application process waiting for the conventional transmission control protocol client to receive content from the content provider before the timer indicates the predetermined time has expired 202, using an application process to create and transmit a special payload through a conventional transmission control protocol client toward the computerized device 204, and transmitting from the conventional transmission control protocol client a special payload at the same time as resending an acknowledgment message and initial acknowledgment number 206 until the transmission is complete.

When the conventional transmission control protocol device or client does not receive a message or content from the content provider before a timer indicates that the predetermined time has expired for reception of at least a segment of the content 202, then the application, system program, or other process 186 is used to generate a special payload 204. In turn, the conventional transmission control protocol device or client 188 transmits the payload including a re-sent acknowledgment message and initial acknowledgment number 206 via the network 28 toward the content provider 34. Accordingly the content provider 34, upon receipt of the repeat acknowledgment number, re-sends an earlier segment of content 202 as would occur in the case of the other embodiments of the invention.

As described above, the invention is directed to techniques for communicating between a computerized device (a content provider) which is capable of operating as a server having stateless capabilities and an external transmission control protocol device (e.g., a transmission control protocol client). The techniques employ many of the steps performed in a conventional transmission control protocol but vary from the conventional transmission control protocol, in particular, by virtue of the fact that no information about the state of packet or message transmission needs to be maintained within the content provider. In lieu of maintaining state information about unacknowledged messages and elapsed time, the content provider accepts acknowledgment numbers from the external transmission control protocol device that notify the content provider which is the next content segment (otherwise referred to as segments of a file) due to be sent or re-sent to the external transmission control protocol device. Accordingly, computational resources of the content provider are reduced, thereby improving performance of the device, particularly when used with larger numbers of users. Furthermore, the techniques provide increased volume of data transmission as well as improvements in scalability, added simplicity, robustness and decreased vulnerability to system attack.

While this invention has been particularly shown and described with references to preferred embodiments thereof, it will be understood by those skilled in the art that various changes in form and details may also be made therein without departing from the spirit and scope of the invention as defined by the appended claims. For example, the invention envisions a wide variety of configurations of the content provider covering a range from simple to complex devices as depicted in the exemplary diagrams found in FIGS. 2 and 3.

Also, notably, the network 28 may be a typical data communications network or any other facility for electronic transmission. A typical data communications network includes many hosts interconnected by various communications devices.

Data communications devices can be routers, bridges, switches, access servers, gateways, hubs, concentrators, proxy servers, repeaters and so forth which exchange data over an interconnection of data links. These may be physical connections or may also be provided using wireless communication mechanisms. On the low end they may also be as simple as wire connections between two devices. The network allows data to propagate between various applications that execute on the hosts.

Various physical or hardware data communications connection mechanisms allow devices to interconnect with the network 28. Physical data communications connection mechanisms can include modems, transceivers, network interface cards, fiber optic cards, ports and other hardware devices and many others which allow data to be transferred at various data transfer rates (i.e., bandwidth) to and from the host and between data communications devices. For example, certain devices or hosts may have high speed network interfaces which provide connections to the network at high data rate such as fractional-T1, T1, E1 or higher, while other devices or hosts may use an inexpensive modem that provides a maximum data transfer rate of 56.6 kilobits per second (Kbps), more or less, to and from the network.

What is claimed is:

1. In a computerized device, a method for communicating with an external transmission control protocol device, the method comprising the steps of:
   providing an acknowledgment message to the external transmission control protocol device in response to a synchronization message from the external transmission control protocol device;
   receiving a request message for content from the external transmission control protocol device;
   sending, to the external transmission control protocol device, a reply message having at least a portion of the content, regardless of whether the computerized device received an acknowledgment message from the external transmission control protocol device in response to the acknowledgment message provided by the computerized device to the external transmission control protocol device, wherein the step of sending includes transmitting a content segment;
   comparing an acknowledgment number received from the external transmission control protocol device to an aggregate size of the content;
   when the acknowledgment number is one of greater than and equal to the aggregate size of the content, refraining from sending another content segment; and
   when the acknowledgment number is less than the size of the aggregate content, sending another content segment.

2. The method of claim 1 wherein the step of sending includes the step of:
   transmitting the reply message to the external transmission control protocol device in response to request message from the external transmission control protocol device and in the absence of receiving the acknowledgment message from the external transmission control protocol device.

3. The method of claim 1 wherein the step of sending includes the step of:
   transmitting the reply message to the external transmission control protocol device in response to the request message from the external transmission control protocol device and in the absence of establishing a transmission control protocol connection.

4. The method of claim 1, further comprising the step of:
   queuing an acknowledgment message and the acknowledgment number received from the external transmission control protocol device in response to the reply message prior to the step of comparing the acknowledgment number to the aggregate size of the content.

5. The method of claim 1 further comprising the step of:
obtaining first transmission information from a prior message, received from the external transmission control protocol device; and
providing second transmission information to the external transmission control protocol device based on the first transmission information obtained from the external transmission control protocol device.

6. The method of claim 1 further comprising:
wherein the step of sending includes transmitting a content segment;
comparing an acknowledgment number received from the external transmission control protocol device to an aggregate size of the content;
when the acknowledgment number is one of greater than and equal to the aggregate size of the content, refraining from sending another content segment;
when the acknowledgment number is less than the size of the aggregate content, sending another content segment;
transmitting the reply message to the external transmission control protocol device in response to request message from the external transmission control protocol device and in the absence of receiving one of the group comprising the acknowledgment message from the external transmission control protocol device and establishing a transmission control protocol connection;
queuing an acknowledgment message and the acknowledgment number received from the external transmission control protocol device in response to the reply message prior to the step of comparing the acknowledgment number to the aggregate size of the content;
obtaining first transmission information from a prior message, received from the external transmission control protocol device; and
providing second transmission information to the external transmission control protocol device based on the first transmission information obtained from the external transmission control protocol device.

7. An apparatus for communicating with an external transmission control protocol device, comprising:
an input/output interface to communicate with at least one external transmission control protocol device;
a content source to provide content; and
a controller coupled to the input/output interface and the content source, the controller being configured to:
provide an acknowledgment message to the external transmission control protocol device in response to a synchronization message from the external transmission control protocol device,
receive a request message for content from the external transmission control protocol device,
send, to the external transmission control protocol device, reply message having at least one portion of the content, regardless of whether the apparatus received an acknowledgment message from the external transmission control protocol device in response to the acknowledgment message provided by the apparatus to the external transmission control protocol device wherein the controller is configured to transmit, in the reply message, a content segment
compare an acknowledgment number received from the external transmission control protocol device to an aggregate size of the content;
when the acknowledgment number is one of greater than and equal to the aggregate size of the content, refraining from sending another content segment; and
when the acknowledgment number is less than the size of the aggregate content, sending another content segment.

8. The apparatus of claim 7 wherein the controller is configured to send the reply message to the external transmission control protocol device in response to the request message from the external transmission control protocol device and in the absence of receiving the acknowledgment message from the external transmission control protocol device.

9. The apparatus of claim 7 wherein the controller is further configured to queue an acknowledgment message and the acknowledgment number received from the external transmission control protocol device in response to the reply message prior to comparing the acknowledgment number to the aggregate size of the content.

10. The apparatus of claim 7 wherein the controller is further configured to:
obtain first transmission information from a prior message, received from the external transmission control protocol device; and
provide second transmission information to the external transmission control protocol device based on the first transmission information obtained from the external transmission control protocol device.

11. A computer program product that includes a computer readable medium having instructions stored thereon such that, when the instructions are carried out by a computerized device, the computerized device is capable of performing the steps of:
providing an acknowledgment message to an external transmission control protocol device in response to a synchronization message from the external transmission control protocol device;
receiving a request message for content from the external transmission control protocol device;
sending, to the external transmission control protocol device, a reply message having at least a portion of the content, regardless of whether the computerized device received an acknowledgment message from the external transmission control protocol device in response to the acknowledgment message provided by the computerized device to the external transmission control protocol device wherein the controller is configured to transmit, in the reply message, a content segment:
comparing an acknowledgment number received from the external transmission control protocol device to an aggregate size of the content;
when the acknowledgment number is one of greater than and equal to the aggregate size of the content, refraining from sending another content segment; and
when the acknowledgment number is less than the size of the aggregate content, sending another content segment.

12. The computer program product of claim 11 wherein the instructions, when carried out by the computerized device, cause the computerized device to send the reply message to the external transmission control protocol device in response to the request message from the external transmission control protocol device and in the absence of receiving the acknowledgment message from the external transmission control protocol device.

13. An apparatus for communicating with an external transmission control protocol device, comprising:
  (i) an input/output interface to communicate with at least one external transmission control protocol device;
  (ii) a content source to provide content;
  (iii) means, coupled to the input/output interface and the content source, for providing an acknowledgment message to the external transmission control protocol device in response to a synchronization message from the external transmission control protocol device,
  (iv) means, coupled to the input/output interface and the content source, for receiving a request message for content from the external transmission control protocol device; and
  (v) means, coupled to the input/output interface and the content source, for sending, to the external transmission control protocol device, a reply message having at least a portion of the content, regardless of whether the apparatus received an acknowledgment message from the external transmission control protocol device in response to the acknowledgment message provided by the apparatus to the external transmission control protocol device wherein the controller is configured to transmit, in the reply message, a content segment:
    means for comparing an acknowledgment number received from the external transmission control protocol device to an aggregate size of the content;
    when the acknowledgment number is one of greater than and equal to the aggregate size of the content, means for refraining from sending another content segment; and
    when the acknowledgment number is less than the size of the aggregate content, means for sending another content segment.

14. The apparatus of claim 13 wherein the means, coupled to the input/output interface and the content source, includes:
  means for sending the reply message to the external transmission control protocol device in response to the request message from the external transmission control protocol device and in the absence of receiving the acknowledgment message from the external transmission control protocol device.

* * * * *

UNITED STATES PATENT AND TRADEMARK OFFICE
CERTIFICATE OF CORRECTION

PATENT NO. : 7,000,024 B1
DATED : February 14, 2006
INVENTOR(S) : Champagne et al.

It is certified that error appears in the above-identified patent and that said Letters Patent is hereby corrected as shown below:

Column 15,
Line 57, "reply message" should read -- a reply message --.

Signed and Sealed this

Sixteenth Day of May, 2006

JON W. DUDAS
*Director of the United States Patent and Trademark Office*